(12) United States Patent
Davis et al.

(10) Patent No.: US 8,121,726 B1
(45) Date of Patent: Feb. 21, 2012

(54) PRODUCT CONTROL SYSTEM

(76) Inventors: Daniel W. Davis, Plant City, FL (US); Steven L. Zimmers, Cincinnati, OH (US)

(*) Notice: Subject to any disclaimer, the term of this patent is extended or adjusted under 35 U.S.C. 154(b) by 0 days.

(21) Appl. No.: 12/794,011

(22) Filed: Jun. 4, 2010

Related U.S. Application Data

(62) Division of application No. 11/371,420, filed on Mar. 9, 2006, now Pat. No. 7,756,604.

(60) Provisional application No. 60/680,169, filed on May 12, 2005, provisional application No. 60/674,055, filed on Apr. 22, 2005, provisional application No. 60/659,822, filed on Mar. 9, 2005.

(51) Int. Cl.
*G06F 17/00* (2006.01)

(52) U.S. Cl. .................. 700/237; 700/236; 700/240

(58) Field of Classification Search .................. 700/237, 700/240, 236
See application file for complete search history.

(56) References Cited

U.S. PATENT DOCUMENTS

| | | | | |
|---|---|---|---|---|
| 5,988,346 A | * | 11/1999 | Tedesco et al. | 194/217 |
| 6,424,884 B1 | * | 7/2002 | Brooke et al. | 700/232 |
| 6,711,465 B2 | * | 3/2004 | Tomassi | 700/236 |
| 6,792,334 B2 | * | 9/2004 | Metcalf et al. | 700/237 |

* cited by examiner

*Primary Examiner* — Timothy Waggoner
(74) *Attorney, Agent, or Firm* — Wood, Herron & Evans, LLP

(57) ABSTRACT

A vending system restricts, limits and/or controls access and/or to various products, and tracks purchases, use or consumption of those products by an individual, group, class or classification, and implements continued decisions regarding future access within the context of a hierarchy of policy enforcement or guideline recommendations. The individual or group is associated with a unique identification, captured by an input device, such that product selection availability is based upon identity, product type, quantity limits, serving recommendations and nutritional guidelines, user preferences, governance and access restrictions. Subsequent tracking of the dispensing of products, permits the system to compare consumption and make future decisions regarding access to products.

18 Claims, 10 Drawing Sheets

PRODUCT CONTROL SYSTEM

CROSS-REFERENCE TO RELATED APPLICATIONS

This application is a divisional of U.S. application Ser. No. 11/371,420 filed Mar. 9, 2006, now allowed, which is a continuation-in-part of U.S. application Ser. No. 60/659,822, filed Mar. 9, 2005, U.S. application Ser. No. 60/674,055, filed Apr. 22, 2005, and U.S. application Ser. No. 60/680,169, filed May 12, 2005, each of which are hereby incorporated by reference herein in their entirety.

FIELD OF THE INVENTION

The present invention relates to policy enforcement of dispensed vending products based upon an individual user identity.

BACKGROUND OF THE INVENTION

Vending systems are installed within many organizational and institutional buildings and facilities, both public and private, to provide convenient access to foods, beverages and assorted products for the convenience of patrons. This availability without the expense of "manned" or "human-staffing" requirements to complete these transactions in exchange for these vended products benefits both the merchants and the patrons. Whenever the needed vended product is conveniently available, a patron can complete a transaction without external assistance to receive the desired vended product. Any individual with the physical access and the ability to enter the required financial tender can accomplish the operational requirement to select the desired product and can activate the dispensing of the vended product. Not only do the vending systems provide convenience to vending patrons, but they also provide significant financial benefits to the institutions that make the vended products available to those patrons and populations that frequent their facilities.

Historically, the dispensing of products in vending machines has not been challenged, except in the case of tobacco products. Cigarettes and tobacco products have previously been easily accessible by minors from vending machine systems because of convenient physical access within public and private facilities. This led to significant concerns and the ultimate abolition of cigarette vending machines. The problem simply was that anyone with access to the vending machine could gain access to the tobacco products because there existed no effective pre-authorization method or age verification to prevent the unauthorized dispensing of tobacco products to minors through these vending systems.

The placement of vending systems in general, and product selection availabilities within these vending systems, are typically evaluated and approved by the institutional boards and facility directors in which the vending systems are to be installed. The institutional evaluation often uses the financial interests as a primary consideration for the placement and selection of a specific vending service provider. As with the placement of vending systems within school districts, revenues are the primary consideration when a school district determines what beverage or snack brands are permitted to place the vended products within their facilities. These vending contracts are extremely lucrative for both the school districts and beverage/snack companies because of the captive market that the school district population represents as a customer market for a fixed period of time throughout the school year. These "Exclusive Pouring Rights" contracts are awarded by the school boards to bidding beverage companies by school districts to place vending systems within school districts and make available beverages and other vended products to the student and faculty population. They pay revenues upfront for the placement and also pay sale percentage royalty depending on sales volume. School Boards submit elaborate "Requests For Proposal (RFP)" to potential bidders to determine the most lucrative vending deals possible, and there are also specialized consultants to structure RFP's and evaluate responses to maximize financial returns on these "Exclusive-Pour Contracts". This practice has been executed nationally for some time, however, a recent enormous revenue deal awarded in one of the nations largest school districts has drawn considerable attention and increased scrutiny as to the appropriateness of this practice by School Boards and Beverage/Snack Corporations. As reported in an article titled "Pepsi High" in the St. Petersburg Times on Aug. 31, 2003, the Hillsborough County School District located in the state of Florida awarded the "Exclusive-Pour Contract" to the Pepsi Bottling Group for the sum of 50 (Fifty) Million Dollars over a 12-year period. The extremely large sum of money for access to the student population has led many to question the benefits of this product availability with the increase in childhood obesity and diabetes over the last 20 years within the nation's childhood population.

Nutritional advocates have launched extensive campaigns to expose the potential conflict of interest created within schools when the school districts significantly benefit financially from the increased sales and availability of beverages and "nutrition-less" food items to a student population. More than half of all State Legislatures and their duly elected lawmakers have introduced, evaluated or passed legislative initiatives or enacted laws defining nutritional restrictions regarding vended products within schools. In an effort to counteract these attacks by legislatures, School Boards have empanelled "Nutritional Committees and Parental Review Panels" to review the nutritional impacts of available products and the revenue impacts from implementing such restrictions. Unfortunately, these panels make decisions and shape policy for the entire population, ignoring the consideration of an individual parent's right to determine what specific options should or should not be available for their specific child/children. Granted, the School Board may shape policy to attempt to control access to the vending products by attempting to restrict "time of day" access to vending machines or even mandating that at least 50% of available vending choices be healthy alternative choices, but ultimately, the lack of any actual verification or validation of accessibility on an individual basis will not block the unapproved access by a parent's child/children. The above stated initiatives attempt to define policies and laws that will best interest the overall population, however, the most well intentioned execution of those policies does not actually enforce those policies due to the limits of available vending technologies. It can never police those policies at the individual level unless systems or methods can make it possible for the individual to enforce their individual acceptance, enforce a further restrictions of accepted policies, or even over-ride an accepted policy on any available un-regulated publicly accessible vended product. The specific parent(s) do not currently have the ability to enforce their individual acceptance of established policies, further restrict established policies or further have the ability to over-ride established policies and permit unrestricted access by their child/children to vended products.

Complicating the situation for School Boards, lunch programs are cumbersome and expensive administrative burdens and vending systems can facilitate convenience and efficient distribution throughout the day for supplemental and primary food items. However, vending machine access by children and the lack of "control limits" or "policy enforcement" make it a convenient target for nutrition advocates as a source of obesity. Parental participation in the decision making process within the vending machine during the school day by their child/children is limited to panel or board participation to assist the drafting of general policy and nutritional guidelines. This is less than effective when any child can walk up to a vending machine and buy a candy bar or carbonated sugar beverage without regard for any weight problem or medical condition such as diabetes.

The overwhelming awareness of the vulnerability of our school and organizational populations to emergency situations and terrorist threats have in recent years facilitated the necessity of the development and use of individual identity systems throughout organizations and institutions nationwide. The tragic school events of the Columbine High School massacre, Russian School Terrorist massacre and several other school shooting incidents have accelerated the implementation of student ID programs designed to provide definitive identification and valid head-counts for facility access. Increasingly these ID systems designed to accurately validate one's identity for purposes of safety and security are being utilized for convenience and access to other organizational services, information access and even executing transactions. From checking homework grades on the Internet to getting tickets and attending a basketball and even getting discounted movie tickets, school ID's are often used as an administrative tool in the management of populations and the uniqueness of an individual identity within that population.

BRIEF SUMMARY OF THE INVENTION

Considering the above stated background, current food and product vending systems provide no pre-qualification system or method to validate and authorize access to vended products based upon individual user identity, user group or class distinction. Nor do they further control access within any policy context or overall governance structure by enforcing group policy, user class considerations, nutritional guidelines and/or government legislation or enforcement rulings. Furthermore, current beverage vending systems do not attempt nor determine the identity of the patron or further determine the appropriate/authorized product selection based upon the users identity and further ever consider or evaluate all of the above within the context of any applicable nutritional access restrictions, parental permissions context and dependant privileges, or evaluate prior consumption or usage limits.

The invention described in this patent application satisfies these fundamental needs. The invention builds from the recognition that almost all schools, businesses, organizations and institutions, both private and public have vending systems for the convenience of the patrons that frequent those institutions. Utilizing the principles of the present invention, the product control system identifies a specific individual, group or class and validates or permits access to particular vended products based upon stored values or policy guidelines as defined by the governing individual, group or class.

It is notable that "Universal Service Fund" dollars collected as USF fees on telephone bills, simultaneously facilitated and funded the installation of Internet access for virtually all schools throughout the United States. Permitting access to the information super highway and expanding communications and learning capabilities for the nations children was a national priority and USF funds covered the costs associated with the infrastructure installation necessary to make this a reality. Utilizing wired local area networks, as well as more recently prevalent, wireless networking; all schools have convenient access to inexpensive communications channels and solutions that may be applied to principles of the present invention.

Although the specific embodiment of the invention described below is primarily directed to the vending of products within schools and school districts, principles of the present invention are equally applicable to other organizations and institutions utilizing product distribution systems and product distribution systems that may utilize the product control system in the dispensing of various products.

Thus, the principles of the invention feature a system and method to restrict, limit and control access and/or un-restrict access to various products, then track that purchase, use or consumption of those products by an individual, group, class or classification and make continued decisions regarding future access within the context of a hierarchy of policy enforcement or guideline recommendations.

This system accomplishes this by storing or associating the individual or group with a unique identification number, providing an input device to capture the unique identification number, product selection availability based upon identity, determine any product quantity limits, serving recommendations and nutritional guidelines that may exist; then compare this information to user preferences, governance and access restrictions associated with the unique identification number, class or group classification and allow or deny access to the selected product or quantity. Subsequently tracking the dispensing of products to compare consumption and make future decisions regarding access to products.

One application of this invention can be applied to vending machines located within schools. School administrators or Board members could restrict, limit or provide unlimited access to vending machine products either individually by product or categorized by nutritional content by group definitions such as student grade level. For example, elementary students could only have access to food products such as milk, water or an apple or yogurt, while allowing high school students to access food products such as soda, candy and chips. This same system may define multiple grade levels for product restrictions, limitations and/or unlimited access. In the previous example, the school administrator has restricted access to food products such as soda and candy to all except high school students. If each student had a unique identification number such as a student id, the school administrator could allow a parent or guardian to further restrict, limit and/or un-limit access to certain food products, thereby overriding the school level restrictions and/or limits. For example, while the school administrator has granted access to soda for high school students, the parent or guardian of an individual high school student may wish to further restrict and/or limit access to soda or wants to limit amount of soda consumption. Each vending machine could also have a unique identification number used for reporting or to restrict or limit access to an individual vending machine.

This system and method addresses the childhood obesity issue in a systematic intelligent manner by providing a "portion control" method tied to an individual identity. The individual identity provides authorized access to available product selections and stores and associates personal parental preferences, hierarchies, historical data, reporting and demographics with that identity. This technology can now provide help and information to children who are drinking unhealthy quantities of high sugar drinks and at the same time not punish the responsible consumer by restricting choice. Additionally, parents can receive alerts when a child is consuming products beyond a defined threshold.

Also providing a systematic way to implement time schedule limits on consumption by permitting consumption only at scheduled times such as lunchtime or during study hall. To facilitate this, the system could be loaded with student schedule data so that "study hall" would be dynamically associated with each semester's change in the student's schedule.

There is also the possibility of combined applications to teach resource allocation and practical life skills. That is, the server might permit tradeoffs between soda consumption and TV/computer time. That is, consumption of a soda costs 30 minutes of TV or recreational web site time, and so on. This would be a critical life skill teaching tool as well as developing lifestyle and dietary habits. It is critical for all of us to learn about limited resources and how to manage them, starting as young as possible.

This system can also incorporate a loyalty or rewards system, whereby the group or individual associated with the unique identification number gains benefit from the purchase of these specific food products and/or individualized decision making such as a child's selection of healthy choice products. This would provide a motivation for children to make healthier choices throughout their school career and provide historical perspective and improved action items to parents regarding their child's nutritional intake. Rewards could be in any form from free or reduced price products for better academic performance or good attendance—associating rewards with the specific user from within the vending machine. Negative reinforcement may also be implemented by further limiting access privileges as a form of discipline.

With access to two-way communications technology, technology-based rewards such as MP3 format music downloads directly from the vending machine or on a related web site are also possible. Assigning a points system to each individual food product and then providing rewards on accumulated points tied to the consumption of the specific food products could accumulate more points for healthier food products or better rewards for healthier food products.

This system could also contain a financial system where a payment method or account balance is associated with the unique identification number. This could allow for a cashless environment where a consumer would not need cash to purchase the food products. This system could also incorporate a method or system for replenishing the account balance in an account based system by automatically replenishing the account when it falls below a certain account balance.

While the above method is used in vending machines in a school setting, it could just as easily be used for any food product distribution such as cafeteria lunch lines or utilized within other settings such a business or institution. The principles of the present invention could also be applied to other types of products that are not food based where there is a need to restrict, limit and/or un-limit access then track the acquisition of the product, use and/or consumption of any distributed product to a group or individual.

The system can have a tandem configuration where a similarly configured system communicates with the first system to share and replicate all data. The systems can then act redundantly and assume all processing in the event that one of the systems or a portion of one system fails. Alternatively, the systems can share and distribute all processing to prevent a single system from being overloaded at high demand times.

There is a wide variety of technology that could be utilized to implement this system and method as follows:

1) Database System.—A database containing the unique identification numbers, group and class distinctions, product identifications and descriptions with their nutritional or product details, stored associations of the unique identification numbers to data elements such as user, group and/or class preferences and/or restrictions/limitations/un-restricted access, administrative elements such as school administration access and parent or guardian access information and associated preferences and dependant association preferences. Additional stored purchasing and transaction access information, individual user, group and class consumption history. This database could reside in each individual vending machine or dispensing system or be centrally located and/or operating redundantly.

2) Administrative Access—Administration of this system could be accomplished with any acceptable two-way communication media. For example, user settings and policies can be established, changed and deleted via any telephone (wired or wireless) or by data entry through an interactive voice response system (touch tone or voice recognition) and/or over a computer network (wired or wireless). The computer network could be a local private network or a global network such as the Internet. The interface could be anything from a computer using a web browser, another application, telephone, PDA and/or wireless device. Reporting, monitoring and notifications as well as other administrative functions could also be accomplished via email or other text/instant messaging capabilities or other messaging protocol.

3) Product purchase, use or consumption.—This system can restrict, limit and/or un-limit access by individual products, groups of products from within individual vending machines and/or product distribution systems as well as from within groups of vending machines. Associations of locations for individual machines and systems may also be stored for determinations of access decisions. The restrictions, limits or lack thereof can be applied to single purchases, time-based purchasing (monthly, weekly), purchase frequency (within 24 hours) and cumulative purchases (maximum 100). All associations may be factored individually or collectively for determination of restriction, limitation and/or un-limited access to the dispensed product. For example, a particular user may or may not have a single soda, may have one soda per day, may have three sodas per week and/or have unrestricted access in months that have an "R" in the name (like January). Also multiple time-based or calendar restrictions, limitations and/or un-limited access criteria can be applied. For example, the system could allow 1 soda a day not to exceed 3 sodas per week as well as one juice every month not to exceed six per year. The system can also apply restrictions and limits by time of day or day of week and/or month of year, as well as any durations of seconds, minutes, hours, days, months or years. For example, apple juice is accessible from 12 to 1 PM and orange juice is accessible from 6 to 7 PM but only once every 48-hour period. Any of the above restrictions, limitations and/or un-limit access settings may be applied independently or combined into complex permissions and also associated with prior consumption history to determine future product access restrictions, limitations and/or unlimited access.

4) Vending machine ID input device.—The vending machine could capture the unique identification number via any traditional method such as a keypad, card reader, radio frequency or RFID, or infrared device. These devices could read the unique identification number from a credit card style plastic card with a bar code or magnetic strip, infrared signal from a PDA or remote control device, computer or other electronic communication device.

5) Communications.—The product control system may communicate with the database system via any two-way data communication media. This could be over a local data bus to an embedded database or over a wire-line or wireless telephone network such as a dialup line; and/or a wire line or wireless data network such as a local network or Internet connection.

The capabilities of this system can also act as a tracking system for user, group and/or class consumption by storing the history of product selection and product consumption. Providing aggregate and detail stocking and summary reporting assists in maintenance visits and logistical scheduling to service the Product Control System. Storing consumption and associating those records with individual user, group and class information can provide valuable demographic information for market analysis and optimum stocking forecasts. The delivery of periodic calendar reporting and on-demand variable time-based reporting can be delivered via any two-way communications media using administration contact information stored in the authorized administrative database.

Consumption alerts, intermittent threshold reports or even minimal consumption alerts (not enough consumption of a particular product for optimal health) can be forwarded for every individual transaction the instant a transaction is executed or sent at any stored or preset calendar time interval. Historical reporting can be generated from stored historical transaction data by product control system, individual machine, location, product selection, product groups, user, group and class with quantitative summary and itemized detail reporting.

The previous example of the Product Control System within vending machines for schools represents the supervision and policy enforcement by Parents/Administrators on behalf of children as dependents and minors. These authority figures could only previously control product selection and access in drastic ways, such as the banning of vending machines entirely from schools and placement within restricted areas. At the very least, restricting times of possible access and the controlled placement in supervised locations where access by children to the vending machines can be supervised. The Product Control System also provides benefits for adults, when there is no existing authority figure or external governance to enforce appropriate product selection; self-control is the only option available to assist them in making the right choice. The Product Control System can act with policy enforcement with both mandatory and/or voluntary product selection guidance and restrictions using database associations and historical data when associated with user, group and/or class identities.

A global governing entity may define governance controls of product access and install a global policy defining access levels to specific product(s) or groups of product(s). However, this governance can be defined and enforced as a "best practices" suggesting the recommended "best choices" of available products and be enforced as a "non-restrictive" guideline. If recommended "best choices" recommendations are not adhered to, or abused, by an individual or sub-group as defined by tracking, then "restrictive guidelines may be activated. This activation could be set for automatic implementation upon any quantifiable threshold or reportable definition.

Global governance enforcement may also be applied with a "no-exceptions, restrictive enforcement". No sub-group or individual may define tighter or looser restrictions within the product selections. They must adhere absolutely to the defined restrictions unless changed by the governing authority.

In a more moderate application of governance policy, restrictive governance can permit sub-governance groups/individual participants that are ready for self governance the option to accept responsibility of self-governance and provide them the ability have all product access with tracking capabilities to monitor performance outside "best practices". Providing action items that will educate and train participant habits that will survive beyond the product control system.

An example of a governance control structure for a school vending application of the product control system would first define restrictive state legislation. This may take the form of defining time of day access restrictions, vending location restrictions, product selection restrictions associated within grade levels or the child's age. The legislative restrictions may require enforcement with no exceptions. No sub-governance such as the school administration, teachers associations or parental groups may "over-rule" enforcement and permit access within the legislative restrictions to either ease or tighten access controls.

When legislation includes guidelines or "best choices" that allow only recommended selections, approved sub-groups or organizations may over-ride restrictions. Examples of implementing "best choices" recommendations include adhering, easing, tightening, reporting consumption only, and defining threshold limits for automatic restriction enforcement or ignoring recommendations.

A Federal or State Legislator would act as a prevailing governance body in a school model and the next sub-governance body could be the school administration. The school administration may impose product selection restrictions to any sub-group under its governance. For example, it may restrict, control, track, survey and report consumption by any defined sub-group such as teachers, PTA members, grade levels, gender or custodial staff. By definition of sub-group governance classification allows each organization to determine their own restrictive guidelines and permit sub-governance within their own organization.

The most simple governance model would be persons in the immediate family of a controlled family member and would be those who could say "no" to keep the adult accountable to himself and family for weight loss/consumption limits. Essentially, the Product Control System is a mechanism for consumption intervention.

The product control system will accommodate various vending machine types such as multi-item vending with a single price point for all items, single-item only machines, multi-item and multi-price machines. The transaction can be any combination of cashless, coin or bill, account based with real-time payments or account debiting. Access may also be controlled by tracking and storing the amount of purchases in dollars to limit consumption for budgeting purposes.

Individual vending machines have a unique ID and a vending machine ID within the product control system and can deliver transaction information that is useful in tracking, reporting and enforcing consumption. Vending Machine Location associations can include proximity to pedestrian traffic, mass transit availability, competing food services, athletic/recreation areas or any factors that can expand consumption demographic knowledge. Are machines accessible to the public? Are machines in a private location with a clearly defined population demographic? Private placement such as school/corporate/prison facilities could specify other location attributes such as associating proximity to facility entrances/exits, locker rooms, competitive food services and administrative offices or any other pertinent facility information.

The system may incorporate "velocity checks" to prevent fraudulent activity could account for the speed or rate of consumption as well as the lack of consumption. A "velocity check" on consumption, working from the realization that a student that purchases ten soft drinks in a very short time is very likely reselling drinks to other students who are probably subject to tighter controls on consumption. Also, a "volume check" within a time range would serve a similar purpose, as a student that purchases 5 soft drinks a within 5 minutes day is likely reselling some or all of that volume. Blocking of individual ID(s) may be automatically activated if fraud controls are implemented within the system.

An alternative way to block fraud would be to incorporate biometrics within the identity confirmation process, such as fingerprinting or retinal scan, so that a student cannot claim that excess purchases were made by others who had stolen their identity or identification cards. At the time of transaction authorization, a textual message can be distributed to communications identifiers associated with the specific User ID. Further, an incorporated camera included into the vending machine can also capture an image of the user at the time of authorization to be archived, forwarded to an administrator/guardian via email for quality control, or isolated and categorized by transaction date, product selected, TOD. Archived images can also be viewable within the context of user profile as to provide indications of user demographics and generic lifestyle preferences of that specific beverage consumer.

This Product Control System allows the product distributor to control access to its available product line, but also permits the distributor to more effectively understand its product consumers by tracking behavior and selection preferences because the access and usage are associated with specific user ID(s). Any demographic characteristics and information associated with individual ID(s) can provide product distributor(s) valuable information that can allow them to more effectively provide more desirable choices and better alternative selections should consumer trends shift. For example, are consumers trending toward a lower carbohydrate alternative when they normally select the full carbohydrate beverage. If users, groups or classes are trending toward an alternative product, the historical transaction data could answer; "What is the adoption rate?" During month one (1), a consumer selects low carbohydrate alternatives 25% of the time when they are presented with the new selection, during month two (2) they select the new alternative 50% of the time, and then suddenly a behavioral reversal shows month three (3) with 0% selected low carbohydrate alternatives. The low carbohydrate diet has played itself out and the low carbohydrate alternatives are no longer selected after month two (2). This particular behavior model is representative for males age 14-16 and it can now be tested in other demographic groups and in other geographies because of specific consumption tracking associated with individual demographics in diverse geographies. The statistical data storing and analysis of historical transactions and user data provides significant market information with the Product Control System.

Tracking final selection preferences in the context of other available vending machine choices can also provide beneficial information, but also tracking selection preferences in the context of unavailable preferences. For example, if within my historical preference I am a preferred diet soft drink consumer, and I am presented with "NO" diet soft drink choice, will I select a diet tea or water? These questions can also be answered by tracking consumption in the context of selection availability, either stocked or un-stocked within the vending system. Questions such as: Do Males, age 14, have a tendency to adopt new flavors quicker than females? Do Females, age 14, prefer unsweetened tea to water when the Diet soft drinks are empty? The vending machine becomes a remote focus group that allows the brand manager to capture the data, review for defining patterns and then check across diverse geographies and various demographic groups.

The above context of data collection within the system would be effective as market research tool by tracking consumption without setting any limits or governance policy enforcement at all, just store and associate transactions to user, group and class demographic data.

As an added benefit, a vending machine provider using the product control system can't possibly provide every possible product selection within a limited slot machine, but consumers could use the Product Control System to vote for an unavailable choice outside the provided product selections within any particular vending machine. Adding a survey capability, by adding a "voting button" could also empower consumers at locations to request their desires and a decision may be implemented based on survey results. This permits the vending provider the ability to improve the efficiency and profit potential from the machine and improve revenue with more popular/new product selections. Due to the accessibility of specific demographic groups to a specific machine, product selections dispensed may be very different than other machines in different locations in the same facility or different facilities in different geographic locations. Vending machine geographic identification may also improve efficiency, if for example a specific location revealed a desire for a specific flavored item, then an appropriate stocking quantity could be installed to minimize service visits and maximize profits.

The Product Control System could also act as a new product sample delivery system and future sales survey system. A vending provider could allow one free unit per identity to introduce the product. When combined with the consumption tracking, one would not only gain re-purchase statistics, but actually see how package design affects acceptance on a gender, age or other pertinent demographic data.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE INVENTION

Figure 1:
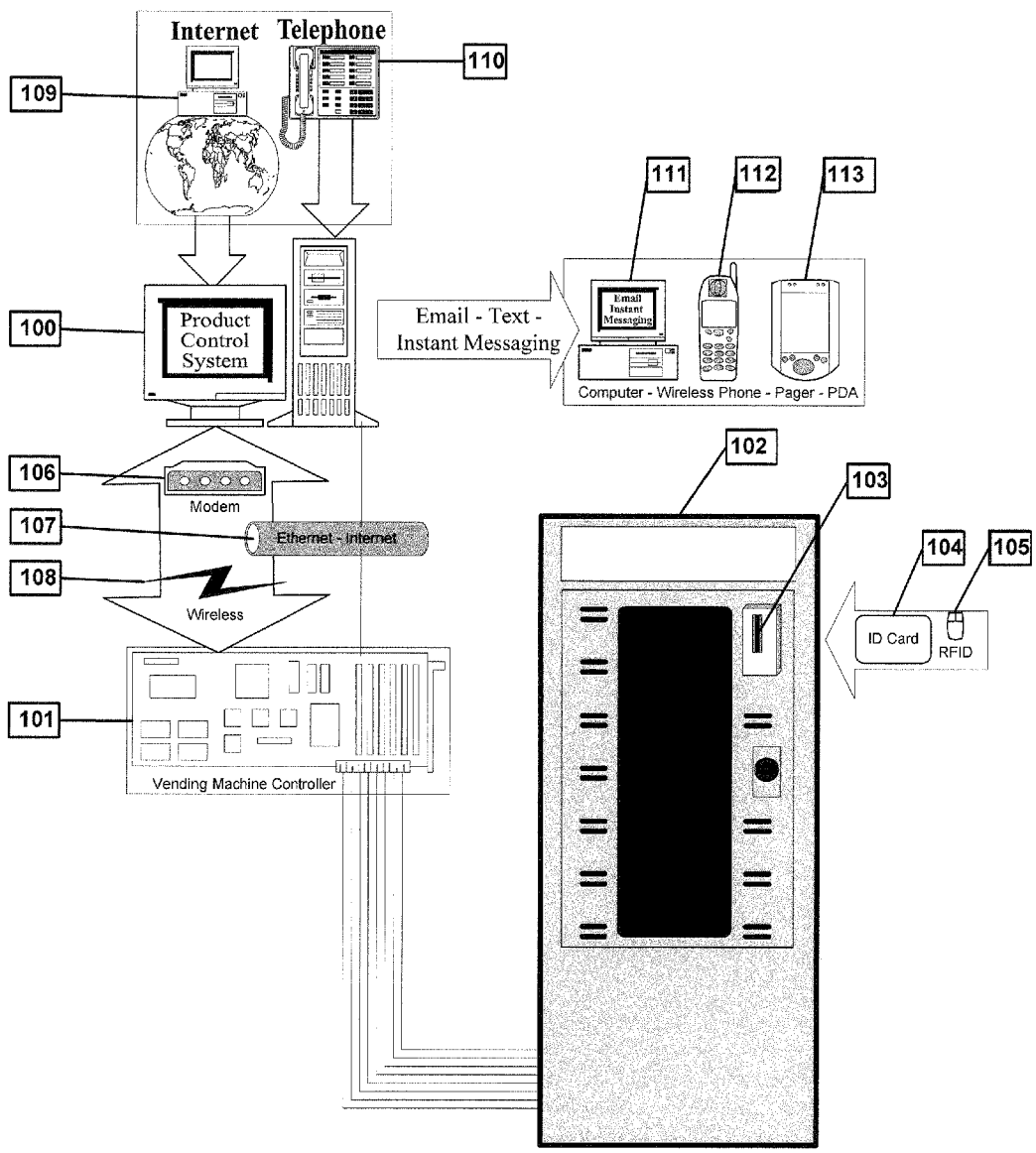
FIG. 1 is a diagram of a system in accordance with the principles of the present invention within the application of soda vending machines in schools.

FIG. 1 illustrates principles of the present invention, applied to a soda or other beverage vending machine. Control system 100, which comprises a personal computer, interacts via the Ethernet or other networking technologies 107 or a modem 106 or a wireless connection with a remote vending machine controller in a vending machine 102. Vending machine 102 includes an identity reader 103 for use with an identification card or an RF identification device 104. Control system 100 further interacts via the Internet 109 or telephone 110 with external parties such as system administrators, parents, beverage cardholders, guardians, users or groups, to obtain constraint information for storage within product control system 100, or to change or alter settings for product control system 100. Product control system 100 for delivers notifications or messages via e-mail, text messaging, or other instant messaging technologies to remotely located computers 111 and/or wireless phones 112 and/or pagers or personal digital assistants 113.

Vending machine 102 and product control system 100 are utilized in the following manner. A vending machine user is issued an identification card or other identification device which is validated by reader 103 in vending machine 102, and the identity is delivered to vending machine controller 101 which utilizes internal storage or interacts with product control system 100 to associate that identity with the appropriate constraint on product purchases. The allowed product purchases are then indicated on the display on vending machine 102 and the user may then select the desired product for purchase. A record is maintained in vending machine controller 101 and/or product control system 100 of each purchase made for the purposes of historic tracking. Constraints may be altered or modified by responsible persons or administrators via the Internet 109 or telephone interface 110, and records of product purchases may also be obtained and reported upon by the same modalities. Furthermore instant notifications of product purchases or purchasing behavior including attempted product purchases may be delivered from product control system 100 via e-mail, text or instant messaging, to a remote computer 111 wireless phone 112 or pagers or PDA 113. Specific details of the interactions of administrative parties via the Internet interface are provided in the following figures.

Figure 2:
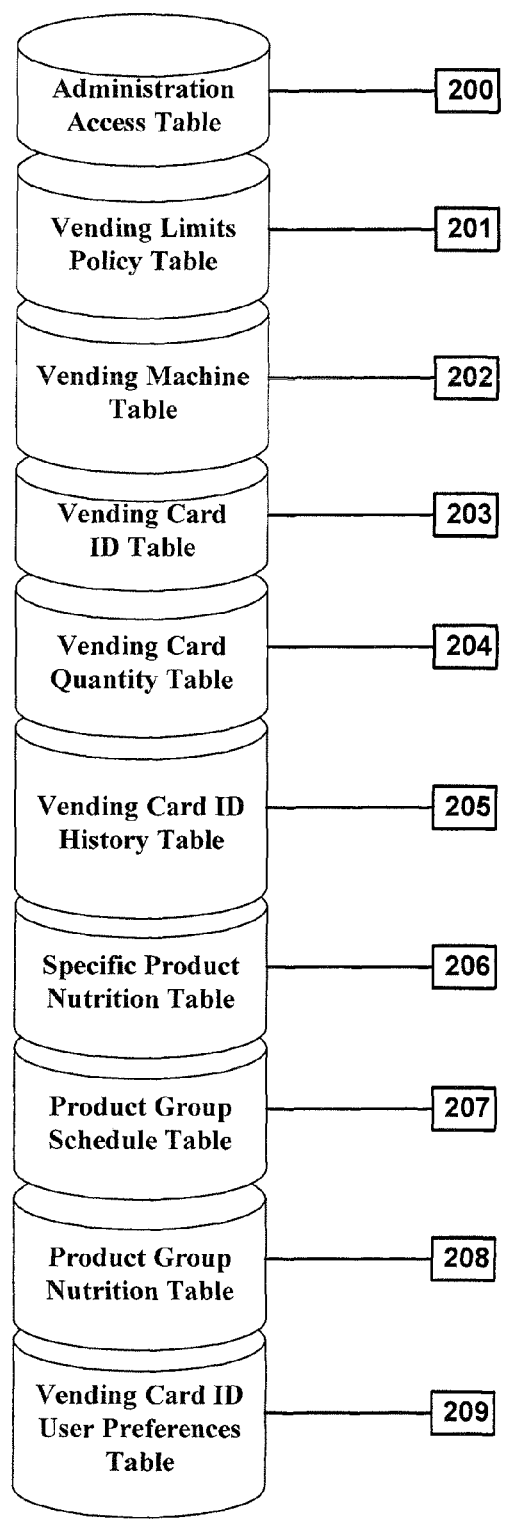
FIG. 2 is diagram of the database tables used by the system of FIG. 1 in accordance with the principles of the present invention.

FIG. 2 illustrates database tables utilized by product control system 100 of FIG. 1 in accordance with principles of the present invention. Within these databases are included an administration access table 200 which identifies all users of the system, from administrative users, to beverage purchasers, arranged in a hierarchical structure, where levels of hierarchy constrain the amount of access that is permitted for both product purchases and for adjustment of constraints of other users.

Vending limits policy table 201 establishes governmental, school, or parental policies for the vending of items by the individual users who are controlled by the product control system.

Vending machine table 202 identifies vending machines subject to the product control system for embodiments in which multiple vending machines connect to a single product control system and are under the global controller thereof.

Vending card ID table 203 provides the identifiers of individual vending cards or other ID devices and associates those vending card ID's with identities within administration access table 200.

Vending card quality table 204 stores limits for purchases of particular product types, or particular products, for use in implementing constraints on purchase amounts, or purchase velocity, on a time and identity basis.

Vending card ID history table 205 stores a historical record of purchases and uses of a vending card identifier for the purpose of subsequent reporting and auditing.

Specific product nutritional table 206 identifies the nutritional information for specific products available from vending machines for use in implementation of constraints based upon product nutrition such as sugar content, carbohydrate content, and caffeine content and the like.

Product group schedule table 207 identifies the product groups and time constraints and other constraints associated with product groups that and are not individually identified for the purposes of the product control system 100.

Product group nutritional table 208 identifies average nutritional information for product groups that are identified in the product group schedule table 207, and is utilized in conjunction with nutritional criteria for an implementation in which products are grouped and are identified by group when purchased.

The vending card ID user preferences table 209 stores individual policy variations for individual users of the system such as policy variations put in place by parents or administrators for particular individuals, which may be done voluntary or on a compulsory basis. Table 209 overrides and may further constrain or may relax the constraints of the vending limits policy table 201. Information provided in preference table 209 include daily, weekly, or monthly calorie limits, limits for sugar, caffeine, and carbohydrates.

It will be appreciated that the information collected in the tables of FIG. 2 include sufficient demographic information to prepare reporting on a demographic rather than individualized basis. Reports of consumption trends, preferences and marketing response are among the possible topics of reports.

Figure 3A:
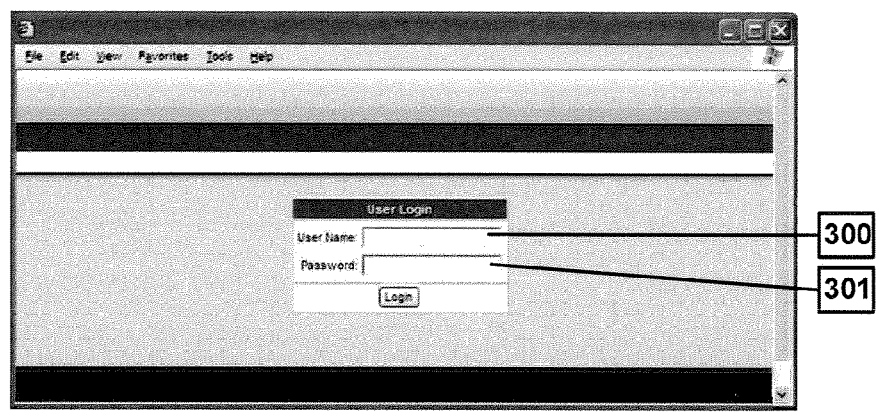
FIG. 3A is an illustration of the Internet web browser interface Login screen for the administration and manipulation of user database information in accordance with the principles of the present invention.

Referring now to FIG. 3, a user login screen utilized by the Internet interface to product control system 100, permits user access to control and reporting functions by supplying a user name and password in login areas 300 and 301.

Figure 3B:
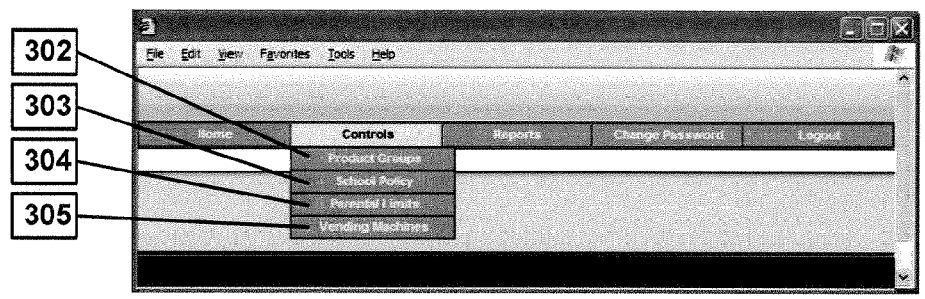
FIG. 3B is an illustration of the Internet web browser screen for the selection of Controls for use by the Product Control System within the application of soda vending machines in schools in accordance with the principles of the present invention.

Referring now to FIG. 3B, after successful login, a user is presented with a number of options which may be selectively enabled and disabled based upon user identity. The controls available to a particular user include a control for selecting and identifying product groups, a control for identifying and selecting school policies, a control for selecting and identifying parental limits, and a control for identifying and selecting particular vending machines, as illustrated at 302, 303, 304 and 305.

Figure 4:
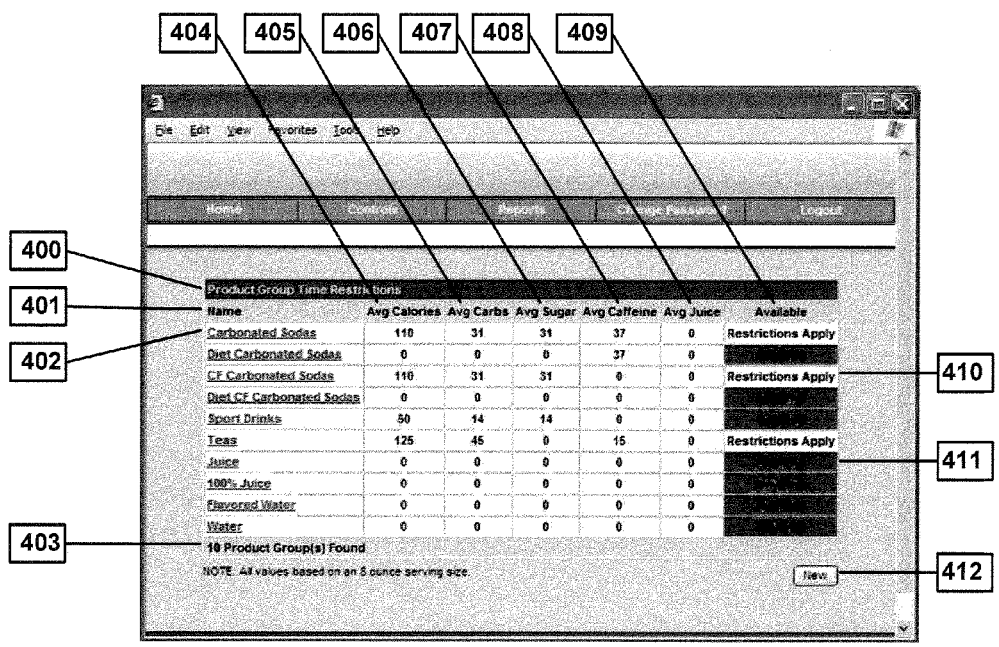
FIG. 4 is an illustration of the Internet web browser screen displaying database records for the Product Group Time Restrictions of the Product Control System within the application of soda vending machines in schools in accordance with the principles of the present invention.

FIG. 4 illustrates the product group restrictions that are selectable via control 302 in FIG. 3B. Product group time restrictions are identified in a table 400, for individual groups of products, as named in column 401. The product groups include for example, carbonated sodas at 402 and other beverage types such as sport drinks, juice, water, and other product groups as defined in this implementation of the principles of the invention. Each product group is associated at 404 with its average calories, at 405 with average carbohydrate, at 406 with average sugar, at 407 with average caffeine, at 408 with average juice content, and thus providing a detailed profile for each product category. School or government guidelines or policies on consumption may be implemented by the application of restrictions to particular product groups, as shown in column 409. Specifically, particular items such as carbonated sodas in row 402 or row 410 may have applicable restrictions as illustrated in column 409, whereas other drinks such as juice drinks in row 411, made be left unrestricted at any time.

Product groups may be added by the use of a "new" button 412. The restrictions defined in column 409, may be time based restrictions that are elaborated upon and subsequent Figs. Other types of restrictions may also be made applicable.

Figure 5:
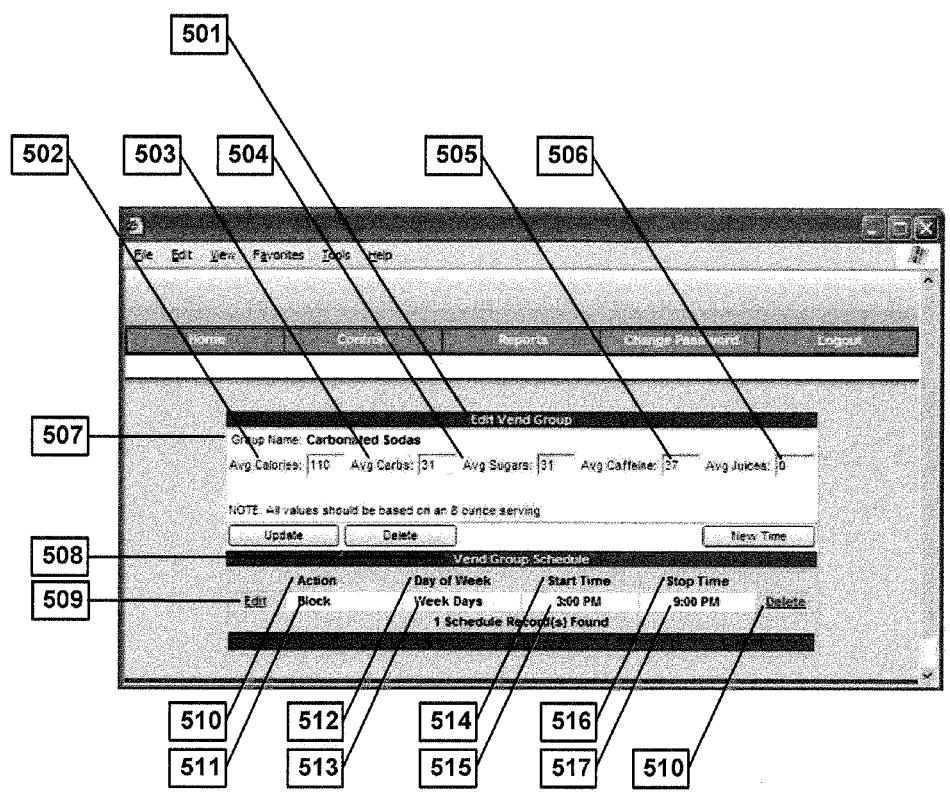
FIG. 5 is an illustration of the Internet web browser screen displaying database records for the Edit Vend Group of the Product Control System within the application of soda vending machines in schools in accordance with the principles of the present invention.

Referring now to FIG. 5, restrictions applicable to a given product group 507 may be identified and edited, within an edit vend group window 501. For each individual group identified at 507, the average calories 502, average carbohydrate 503, average sugars level 504, average caffeine level 505, and average juice content 506 can be edited and input. A time schedule may be identified in the area 508 of the window, including particular actions in column 510 which may include a block action 511 or limitation of quantity, or other appropriate action for a given consumption limitation or velocity limit Columns 512 and 513 define a time period during which the system may block or allow consumption, such as on particular days a week, only weekdays Monday through Friday as shown that 513, or only weekends. Time ranges applicable to a particular vending group are shown at column 514, such as starting after 3 PM, and stopping at 9 PM as shown at 515 and 517. Schedules may be established for any and all of the vending groups illustrated in FIG. 4. Furthermore, the group scheduling may be edited by the use of edit control 509 or may be deleted by the delete control 510.

Figure 6:
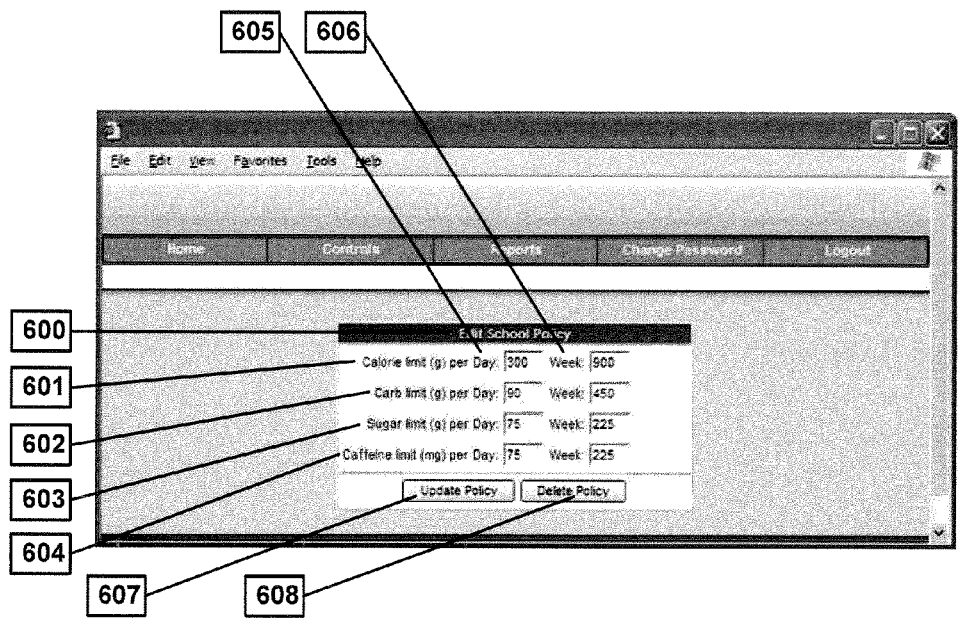
FIG. 6 is an illustration of the Internet web browser screen displaying database records for the School Policy of the Product Control System within the application of soda vending machines in schools in accordance with the principles of the present invention.

Referring now to FIG. 6, school policies may be adjusted by selecting item 303 in FIG. 3B, using an edit school policy window 600. Other policies, which are not school policies, such as such as parent teacher association policies, state regulation or local regulation policies may also be implemented through the same mechanism. Policies may not be nutritional in nature, although the policies shown in FIG. 6 are of that type. E.g., policies may be outright bans of particular product types or limits on particular product types without regard to nutritional characteristics.

The illustrated policy is defined by per day limits and per week limits as illustrated in columns 605 and 606, on calories 601, carbohydrates 602, sugar 603 and caffeine 604. Each item is associated with a limit per day and per week. Other types of limits may also be implemented in other types of policies that utilize nutritional information.

After editing a policy it may be updated by the use about 607, or a policy may be eradicated completely by the use of delete button 608.

Figure 7A:
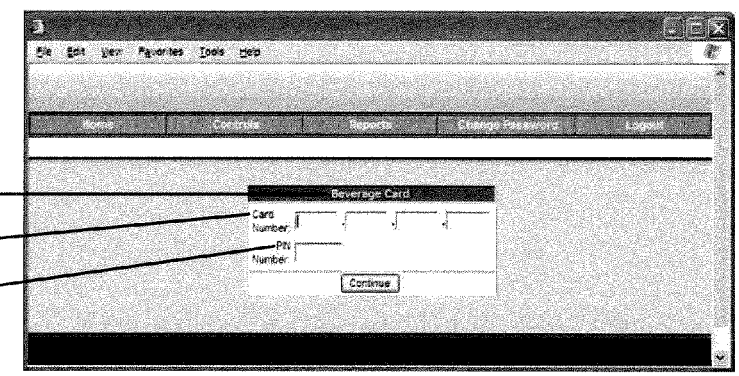
FIG. 7A is an illustration of the Internet web browser screen for entering a specific beverage card identification number within the application of soda vending machines in schools in accordance with the principles of the present invention.

FIG. 7A illustrates the browser screen for initiating the entry of specific beverage card limits, such as would be done by a parent wishing to alter the constraints applicable under school or administrative policies that are by default applicable to all students. After selecting the parental limits in FIG. 3B, item 304, a beverage card window 700 is displayed, in which the parent must identify the card number for their child or other controlled identity, and also supply a PIN number which constrains access to this information.

Figure 7B:
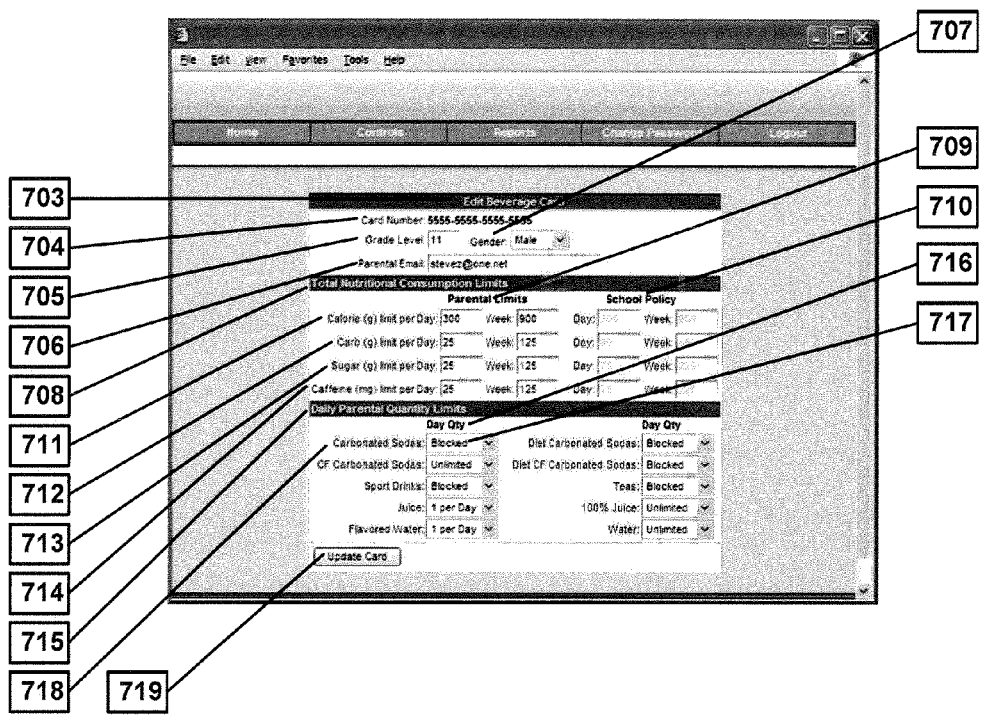
FIG. 7B is an illustration of the Internet web browser screen displaying the database records associated with an individual beverage card within the application of soda vending machines in schools in accordance with the principles of the present invention.

FIG. 7B illustrates the added beverage card window 703 available once a successful login has been completed. This window identifies the card number at 704, and identifies the demographic information for the relevant individual such as a grade level 705, gender 707, and e-mail for the parent 708. Nutritional consumption limits may be adjusted in column 709. Column 710 provides referential information on the school policy, so that a parent may understand how limits the parent is setting, relate to school policy. As discussed above the limits may be identified on various bases, such as a calorie 711, carbohydrate 712, sugar 713 and caffeine 714 total for a day or week. In addition, parental controls may utilize other types of limitations as shown in area 715. Daily parental quantity limits may be applied to product groups identified as shown at 718. For each product group, a parent may select to block consumption of the product group as seen at 717, permit unlimited consumption, or permit a limited number of servings of consumption such as one per day on Juice and flavored water, and the like. After selecting the desired consumption limits the parent may update the restrictions applicable to the identified card with the update button 719.

Figure 8A:
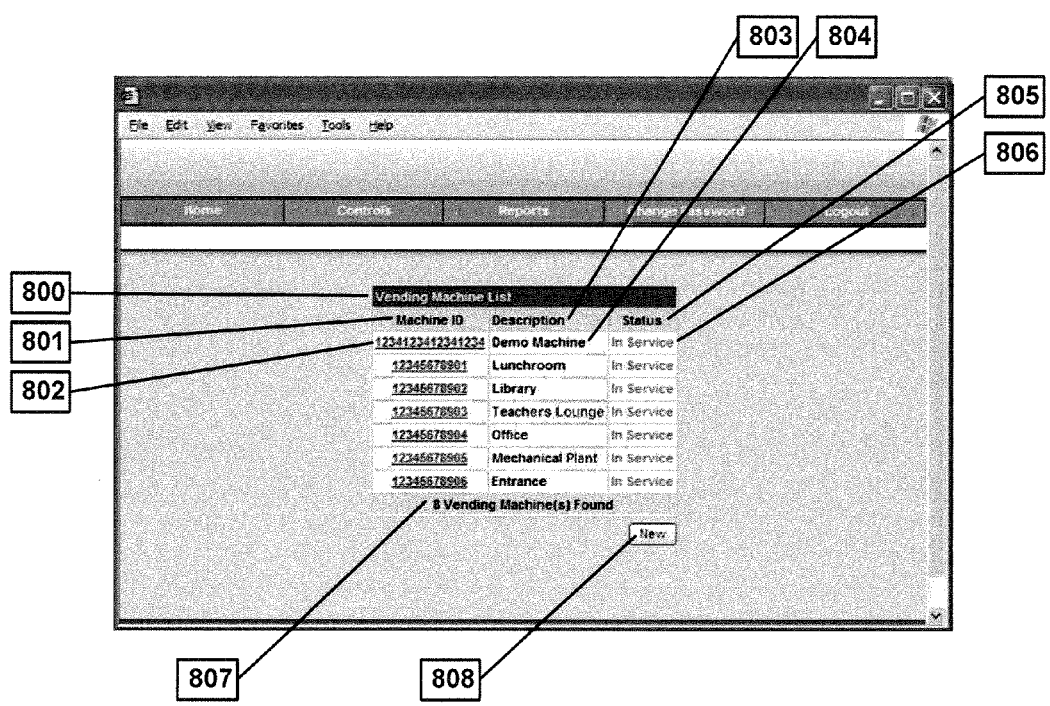
FIG. 8A is an illustration of the Internet web browser screen displaying a list of vending machine database records associated with several specific vending machines within the application of soda vending machines in schools in accordance with the principles of the present invention.

FIG. 8A illustrates the vending machine list that may be accessed by selecting item 505 on FIG. 3B. Administrators may, on the vending machine list, see the current status of each vending machine under control, and also other status that may occur as machines are put into service. Column 801 identifies each vending machine by number as seen at 802. Column 803 provides a description of each vending machine, typically its location as seen in 804 and the following entries. The status of the vending machine is identified at 805, such as in-service at 806, or out of service if the machine is out of service. Other status information may also be provided in column 805 such as whether the machine is out of stock, or out of stock on particular items. The total number machines is identified at 807. Machines may be added by the New button at 808.

Figure 8B:
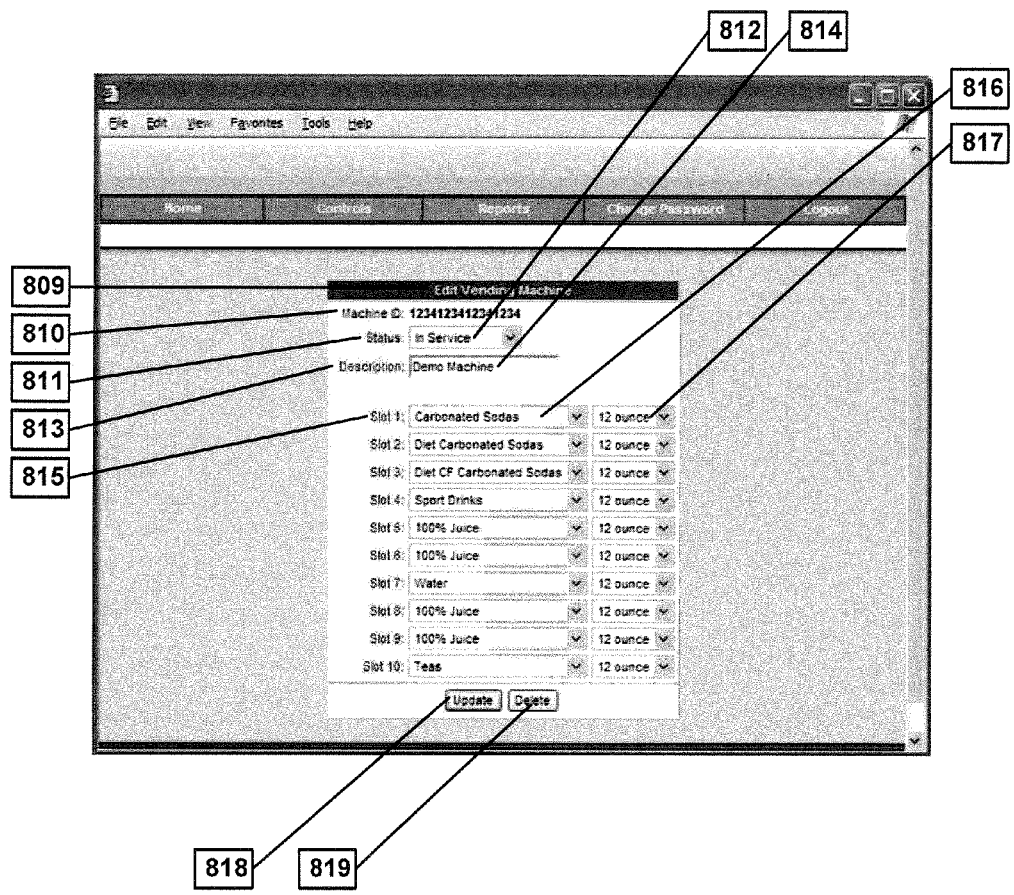
FIG. 8B is an illustration of the Internet web browser screen displaying the database records associated with one specific vending machine within the application of soda vending machines in schools in accordance with the principles of the present invention.

FIG. 8B illustrates the data obtained to add a new vending machine to the product control system 100. Area 810 identifies the machine identifier being edited, and area 811 includes a window for identifying its status, such as "in service" as shown at 812. A further field 813 is used to provide a description, such as the textual description "demo machine" at 814. Further detail on the vending machine is provided in the vending machine window 809, including particularly the product category for each slot 815 in the vending machine. The vending machine in the illustrated example has 10 slots, each slot contains a specific product group, such as carbonated soda at 816 and the like. The product size or volume is identified in area 817—such as twelve ounces (which is typical within United States), or other sizes such as eight ounces, twenty ounces, sixteen ounces or other qualities or other units such as an one-third liter, one-half liter, or other of possible qualities.

Figure 9:
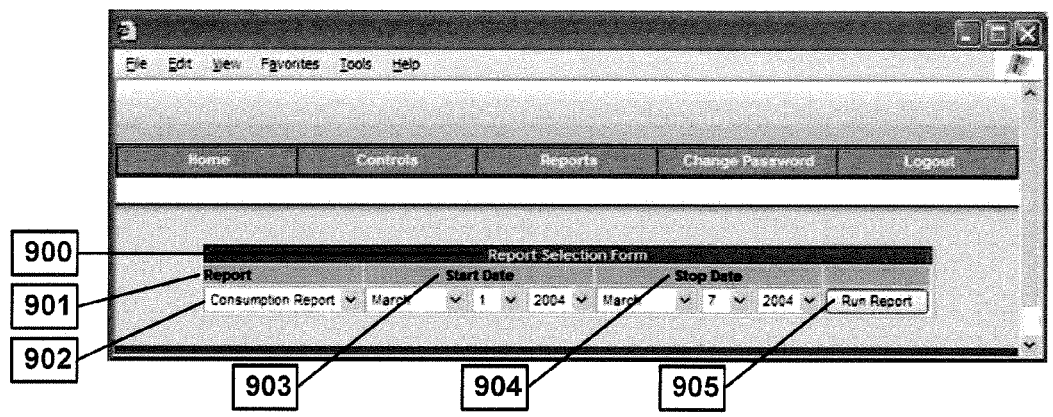
FIG. 9 is an illustration of the Internet web browser screen displaying the reports query for the Product Control System within the application of soda vending machines in schools in accordance with the principles of the present invention.

FIG. 9 illustrates the browser interface for selecting and displaying a report from the product control system, for the vending machine application being illustrated herein. By selecting the reports menu item in FIG. 3B, a report selection form 900 may be displayed. The report selection form 900 includes an area 901 for selecting a particular type of report, such as a consumption report which identifies a controlled individual's consumption over a particular time period. Other reports may include demographic reports identifying demographic totals for consumption, machine consumption reports, product category consumption reports, overall facility consumption reports, location consumption reports status and maintenance reports. Consumption related reports may break down consumption by day, week or month, or by other time bases, and may report consumption for individuals, product categories, facilities, machines or groups of facilities. The consumption report illustrated in FIG. 9 is characterized by a start date which is entered in section 903 and a stop date entered in section 904. Once defined in the illustrated manner, the report is generated by actuating the run button 905, whereupon the generated report is displayed to the user, and may thereafter be exported, printed, or otherwise used in subsequent administrative activity.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed as new and desired to be protected by Letters Patent of the United States is:

1. A vending device that constrains the consumption of items by particular individuals, comprising:
   a. a repository for one or more items available for vending;
   b. a vendee identity system for identifying a vendee requesting the vending of an item from said repository;
   c. a payment system for receiving a payment for vending of items from said repository;
   d. a data store identifying vendee constraints for one or more vendee identities wherein juice beverages are less constrained than soda beverages; and
   e. an authorization circuit for evaluating vendee constraints and a vendee identity to determine whether constraints associated with a vendee identity identified by said vendee identity system permit vending of an item requested by the vendee.

2. The vending device of claim 1 wherein said authorization circuit matches said vendee identity to a vendee identity stored in said authorization circuit and retrieves a constraint associated with said vendee identity.

3. The vending device of claim 1 wherein said authorization circuit fails to match said vendee identity to a vendee identity stored in said authorization circuit and in response retrieves a default constraint associated with vendee identities not matched in the data store.

4. The vending device of claim 1 wherein said constraint prevents the purchase of said item requested by said vendee.

5. The vending device of claim 1 wherein said constraint prevents the purchase of more than a threshold number of said item requested by said vendee.

6. The vending device of claim 1 wherein said constraint prevents the purchase of more than a threshold number of said item requested by said vendee in a threshold period of time.

7. The vending device of claim 1 wherein said items are beverages.

8. The vending device of claim 7 wherein there are plural different types of beverages in said repository, and said constraint differently constrains the purchase of different types of beverages.

9. A method of constraining the consumption of items by particular individuals at a place of public accommodation, comprising:
   a. identifying a consumer requesting the consumption of an item using an identification device associated with said custodial institution;
   b. receiving consumer constraints for one or more consumer identities from said custodial institution wherein juice beverages are less constrained than soda beverages; and
   c. evaluating consumer constraints and a consumer identity to determine whether constraints associated with a consumer identity permit consumption of an item requested by the consumer.

10. The method of claim 9 wherein a match of a consumer identity to a stored consumer constraints is required to permit consumption of an item requested by said consumer.

11. The method of claim 9 wherein the lack of a match of a consumer identity and a consumer constraint permits consumption of an item according to a default constraint.

12. The method of claim 9 wherein said constraint prevents the consumption of said item requested by said consumer.

13. The method of claim 9 wherein said constraint prevents the consumption of more than a threshold number of said item requested by said consumer.

14. The method of claim 9 wherein said constraint prevents the consumption of more than a threshold number of said item requested by said consumer in a threshold period of time.

15. The method of claim 9 wherein said items are food items.

16. The method of claim 15 wherein there are plural different types of food items, and said constraint differently constrains the consumption of different types of food items.

17. The method of claim 9 wherein said place of public accommodation is a school and said consumers are pupils of said school.

18. The method of claim 9 wherein said place of public accommodation is a place of business and said consumers are employees and principals of said business.

* * * * *